UNITED STATES PATENT OFFICE.

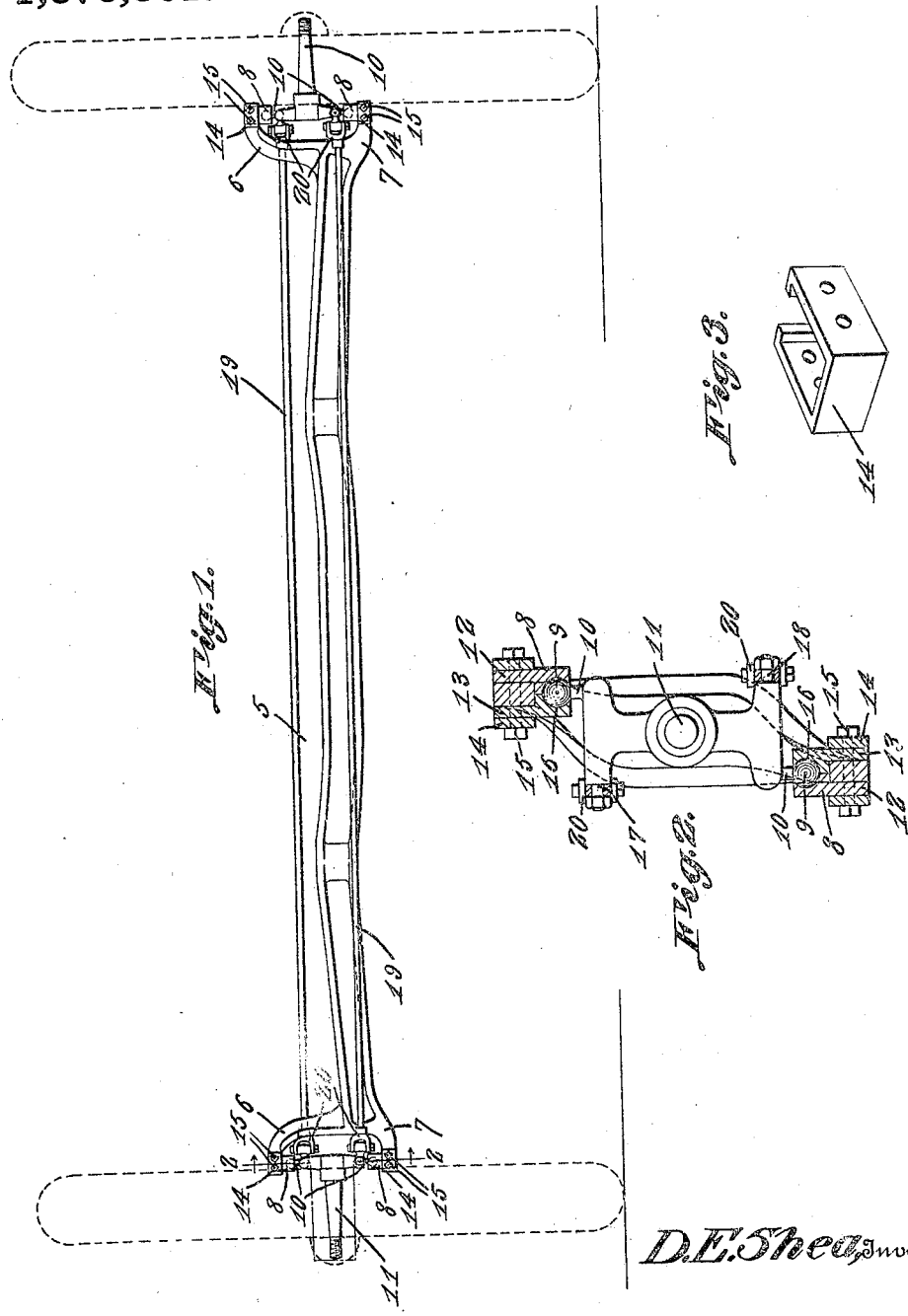

DANIEL E. SHEA, OF WATERTOWN, NEW YORK.

AUTO-SPINDLE.

1,373,361.

Specification of Letters Patent.

Patented Mar. 29, 1921.

Application filed June 23, 1920. Serial No. 391,142.

*To all whom it may concern:*

Be it known that I, DANIEL E. SHEA, a citizen of the United States, residing at Watertown, in the county of Jefferson and State of New York, have invented a new and useful Auto-Spindle, of which the following is a specification.

This invention relates to automobile stub axles or spindles, and it is the primary object of the invention to provide a stub axle especially designed to cause the steering wheels supported thereby, to be elevated upon the turning of the wheels to accomplish the steering thereof.

A further object of the invention is to provide novel means for connecting the stub axles to the main axle of the vehicle to permit the stub axles to be easily moved during the steering operation, thus facilitating the steering of the vehicle supplied with the invention.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a front elevational view of an axle, showing the invention applied, the wheels of the vehicle being shown in dotted lines.

Fig. 2 illustrates a sectional view taken on line 2—2 of Fig. 1, and

Fig. 3 illustrates a detail view of one of the securing members.

Referring to the drawing in detail, the reference character 5 designates the main or stationary front axle of a vehicle, the ends thereof being formed into the spaced arms 6 and 7, which support the bearings 8, which are of the removable type to permit the same to be readily and easily removed and replaced.

As shown more particularly by Fig. 2 of the drawing, the spaced arms 6 and 7 are twisted out of vertical alinement with each other so that they will accommodate the ball heads 9 formed on the free ends of the arms 10, which arms 10 are disposed at the opposite upper and lower edges of the stub shafts or spindles indicated at 11.

The bearings which support the ball heads 9 include spaced members 12 and 13, each of which is provided with a cut out portion adjacent to the upper end thereof, to permit the members to be positioned over the arms 6 and 7, there being provided securing members indicated at 14, and which are in the forms of yokes, adapted to embrace portions of the members 12 and 13 to secure the same in position. Openings are provided in the yokes, which openings receive the bolts 15, whereby the yokes may be clamped to the bearing members 12 and 13 to prevent displacement thereof.

Formed in the adjacent faces of the bearing members 12 and 13, are the cut out portions 16, which are curved to conform to the curvature of the heads 9 so that the heads 9 may be embraced by the members 12 and 13, in a manner to secure the same to the axle 5, and at the same time permit of free pivotal movement of the stub axles or spindles 11.

It is of course understood that it is the usual custom to connect the stub axles or spindles of a motor vehicle, so that movement of one wheel will result in a relative movement of the other wheel of the axle, and to this end the stub axles 11 are each provided with upper arms 17 and lower arms 18 which are connected by means of the steering rods 19, the steering rod being provided with a hinged joint 20 at each end thereof, to permit of pivotal movement of the axles 11 with relation to the steering rods 19.

From the foregoing it is obvious that due to the offset relation of the upper and lower bearings, which support the respective stub axles 11, movement of the wheels to accomplish the steering of the motor vehicle associated therewith, causes the wheels to be elevated to facilitate the steering of the vehicle.

Having thus described the invention, what is claimed as new is:—

In a device of the character described, a main axle having pairs of arms formed at its ends, a stub axle supported between each pair of arms, a bearing carried by each arm, each bearing including opposed bearing members, each of said bearing members having a cut out portion adapted to fit over the main axle, securing yokes embracing the bearing members for securing the bearing members to the main axle, and means carried by the stub axles and positioned within the bearing members for permitting movement of the stub axles with relation to the main axles.

In testimony that I claim the foregoing as my own, I have hereto affixed my signature in the presence of two witnesses.

DANIEL EDWARD SHEA.

Witnesses:
F. G. SMITH,
W. E. BARDEN.